United States Patent [19]
England

[11] 3,973,349

[45] Aug. 10, 1976

[54] FISHING LURE WITH TEMPERATURE SENSING AND THERMOSTATICALLY CONTROLLED DEPTH SELECTION AND GUIDANCE MEANS

[76] Inventor: Will Clarke England, 7310 Eastcrest Drive, Austin, Tex. 78752

[22] Filed: Dec. 4, 1974

[21] Appl. No.: 529,416

[52] U.S. Cl. .................................. 43/42.03; 43/4; 43/42.09; 43/42.39
[51] Int. Cl.² ........................................ A01K 85/00
[58] Field of Search .......... 43/42.03, 4, 26.2, 42.09, 43/42.39, 43.13

[56] References Cited
UNITED STATES PATENTS

| | | | |
|---|---|---|---|
| 2,703,947 | 3/1955 | Petrasek et al. | 43/42.39 |
| 2,715,790 | 8/1955 | Carpenter | 43/42.09 |
| 2,749,646 | 6/1956 | Hall | 43/42.39 X |
| 3,305,964 | 2/1967 | Wieszeck | 43/42.03 |
| 3,722,129 | 3/1973 | Jensen | 43/42.03 |

Primary Examiner—Russell R. Kinsey
Assistant Examiner—Daniel J. Leach

[57] ABSTRACT

An artificial fishing lure having temperature sensing and thermostatically controlled depth selection and guidance means adapted to cause said lure to seek and hold a pre-determined thermal stratum in a body of water where fish of a selected species may be expected to be found. The lure is fabricated of buoyant material and comprises a central cavity housing a bi-metallic heat-sensitive spiral-shaped thermostatic element therein. A pair of elevator fins are positioned on the sides of the lure body and will move up and down upon motion of the thermostatic element in response to water temperature changes.

21 Claims, 9 Drawing Figures

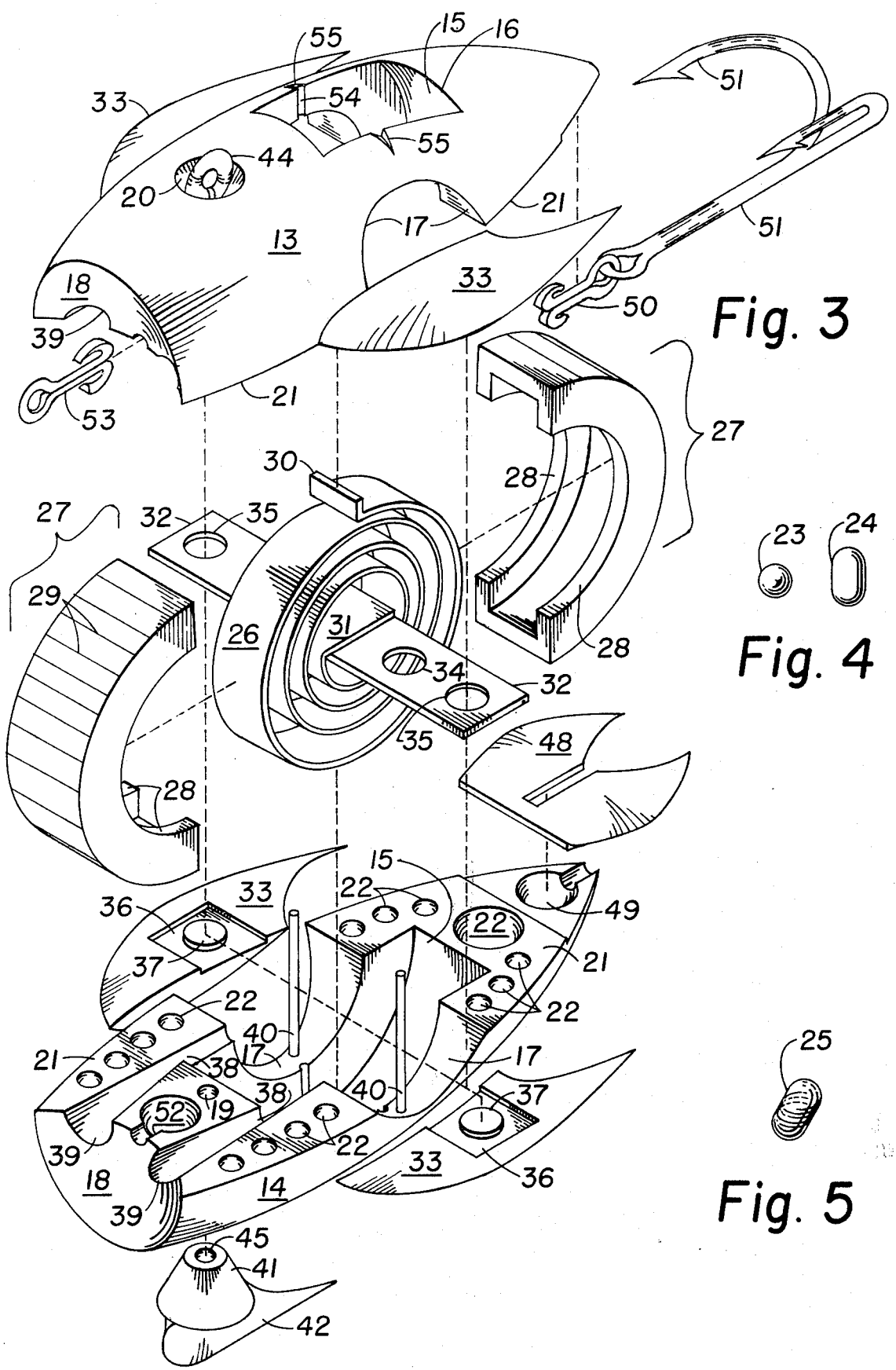

FISHING LURE WITH TEMPERATURE SENSING AND THERMOSTATICALLY CONTROLLED DEPTH SELECTION AND GUIDANCE MEANS

SUBJECT MATTER OF THE INVENTION

The invention relates generally to artificial fish lures and relates more specifically to lures provided with a self-containing guidance apparatus that is thermally reactive to seek and maintain said lure at pre-set water temperature levels.

BACKGROUND OF THE INVENTION

Water in slow moving streams and in lakes, especially lakes produced by artifial dams, usually varies in temperature from cold at the bottom to relatively warm at the surface of the body of water with the water appearing to arrange itself into thermal stratas or layers. Experienced fishermen have long observed that particular types of fish tend to school and feed at particular temperature thermal levels in such bodies of water and it has also been observed that a school of fish that will show pronounced activity and strike at almost any moving object passing through the temperature stratum in which they are most active will abandon the chase of bait or lure that sinks into water colder than their preferred habitat stratum or that rises above the thermal stratum in which the particular species of fish are particularly active. Therefore, fishermen have traditionally attempted to design and select lures that were heavy and that could be employed for trolling at great depth or near the bottom of a body of water or alternatively to select lures of varying buoyancy so that they would troll somewhat under the surface or at the surface of said body of water. If the lure was very heavy it tended to sink not only to the desired level but eventually even beyond the desired strata. A buoyant lure intended for fishing at intermediate depths will usually tend to float upward with the passage of time and as the lure is pulled through the water with the result that the lure will soon rise above the temperature strata where fish of the desired species could be expected to strike. It is therefore a primary object of this invention to devise and disclose an artificial fishing lure having a temperature sensing capacity and thermostatically controlled depth selection and guidance means adapted to cause said lure to seek and to hold at a predetermined thermal stratum where fish of the desired species might be expected to be found.

OBJECTS OF THE INVENTION

Fishermen for centuries have devised and fabricated pluralities of lures made from materials from varying degrees of buoyancy to assist them trolling and fishing at selected depths in the water where fish were believed to live and to be most active. Such lures depended upon intuitive selection of a lure with appropriate buoyancy for the level at which the fisherman desired to fish, and as previously explained, such lures tended to either sink to undesirable depths if left in the water very long or as the lure was pulled in, the lure tended to rise above the selected depths. In order to overcome these difficulties and to eliminate or at least reduce the need for such a plurality of lures, it is a material object of this invention to substitute and provide a single adjustable thermally reactive fishing lure that can be programmed by manipulation of a calibrated mechanically operated depth control mechanism that will automatically cause said lure to climb or to dive in the water in accordance with and in response to sensed temperature of the surrounding water until said lure has found and levelled out at the designated or pre-programmed temperature level.

Another object is to provide a thermally responsive fish lure of the character described with provision for increasing or decreasing the specific gravity or buoyancy of said lure by means of simple mechanical adjustments.

A further object is to devise and provide a lure in which a heat-sensitive spiral thermostat element mounted in the interior of said lure body that responds to the temperature of surrounding water by the coiling or uncoiling of said spiral thermostat element thereby providing rotary adjustment motion to lateral elevator fins on the left and right sides of said fish lure body so that contraction or expansion of the thermostat controlled mechanism rotates said left and right lateral elevator fins to cause the fish lure to ascend in the water or alternately, cause the fish lure to dive to a lower level in accordance with the sensed temperature of the surrounding water.

A still further object is to provide a body structure for said lure that includes water scoop means tailored to conduct samplings of surrounding water through the interior of the lure body to a point where the water is channeled into direct contact with the thermostat sensing and control element in order to provide accurate and immediate response of said lure to changes in the temperature of the surrounding water.

A further object is to provide a rotatably adjustable rudder-like ventral fin on the underside of the lure body that can be manipulated to cause said lure to skew to the left or to the right as it is pulled through the water and thereby impart a more lifelike characteristic to the appearance of said lure.

Still another object is to design and provide a lure that will look and behave very much like a live lure and thereby be more attractive to the fish.

Another object is to supply mechanical means of limiting the maximum angle of climb or dive in order to prevent said lure from getting into a position where it can reverse position or become unstable.

A still further object is to provide an attachable-detachable weight that can be attached to the lower side of the lure body to provide horizontal stability for said lure but with further provision for reversing said weight from the bottom to the top of the fish lure in order to reverse the climb-dive characteristics of the lure to enable the fisherman to employ said lure even in situations where the fisherman encounters a temperature inversion in the water such as a layer of cold water overlying a sub-strata of warmer water.

An important object involves provision for fabricating and attaching replaceable fins with substitute fins to provide the lure with a more attractive and realistic appearance for the habitat area in which the fisherman is fishing.

In furtherance of this objective of making the lure as realistic and lifelike as possible a direct pivot plate interconnection has been provided between the supporting and driving thermostat spiral coil and the left and right lateral elevator fins. Since said spiral thermostat coil provides a relatively unstable mounting means and tends to respond to minute temperature changes the said left and right lateral fins tend to vibrate or flutter as said lure is drawn through the water producing an even more life-like appearance.

These and other objects and advantages will become apparent through consideration of the following description and appended claims in conjunction with the attached drawings in which:

DESCRIPTION OF THE SEVERAL VIEWS IN THE DRAWINGS

FIG. 3 is a perspective exploded view showing the parts of the lure.

FIG. 4 is a perspective drawing illustrating two types of solid weights that can be employed to alter the specific gravity of said fishing lure.

FIG. 5 is a perspective drawing of a variable buoyancy space capsule that can be employed to alter the specific gravity of said fishing lure.

Figure 1:
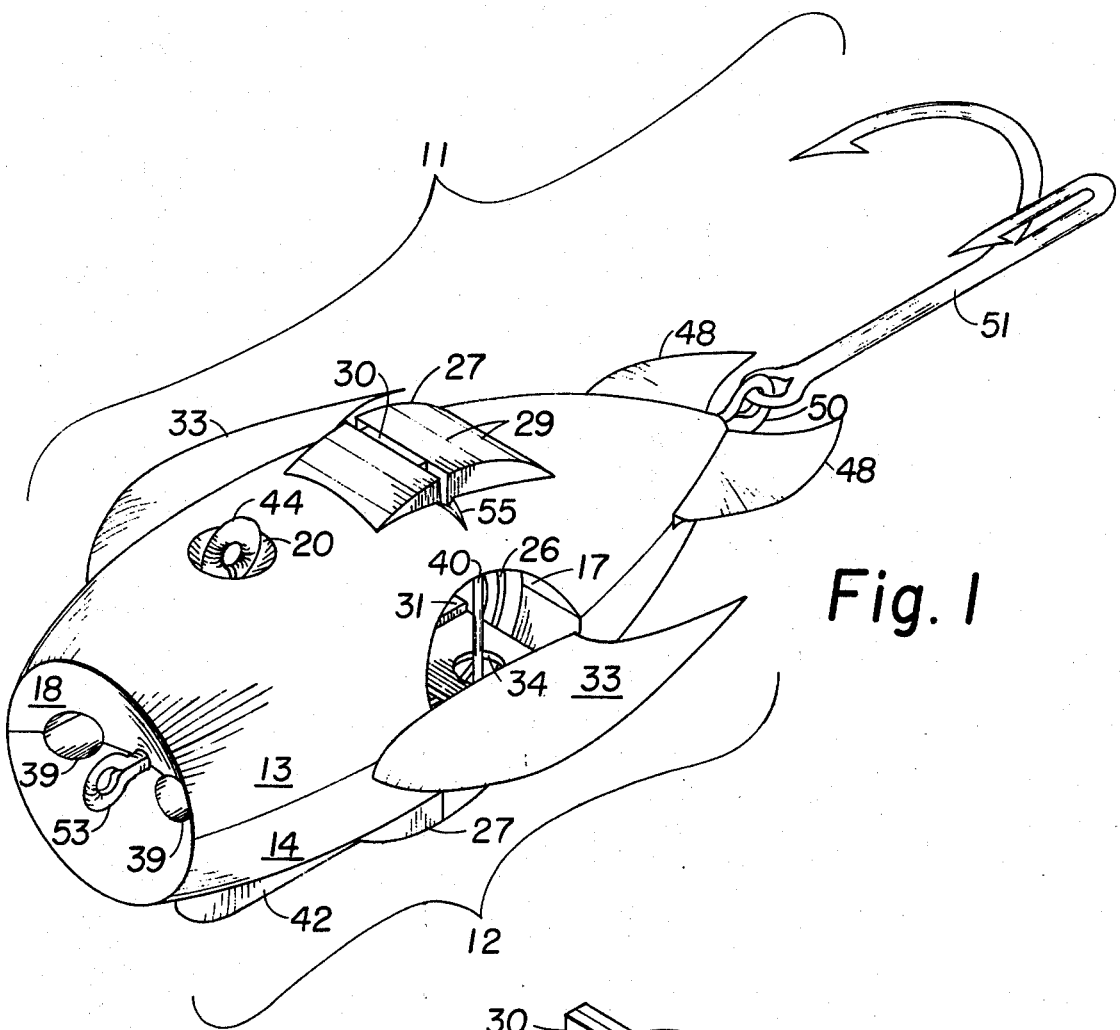
FIG. 1 is a perspective, pictorial view of the thermally reactive temperature level seeking fishing lure assembled and ready for use.
Figure 2:
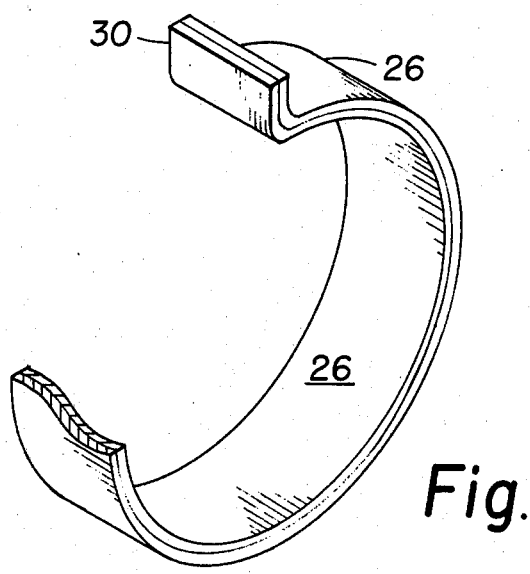
FIG. 2 is a perspective fragmentary view of the spiral strip illustrating its bimetallic nature.

In describing one selected form or preferred embodiment as shown in the drawings and described in this specification, specific terms and components are used for clarity. However, it is not intended to limit the claimed invention to the specific form, components on construction shown and it is to be understood that the specific terms used in this illustration are intended to include all technical equivalents which operate in a similar manner to accomplish a similar purpose.

DETAILED DESCRIPTION OF PREFERRED EMBODIMENT OF INVENTION

Referring to the specific embodiment selected for illustration in the accompanying drawings, the overall thermally responsive artificial fishing lure 11 is preferably fabricated from a very light plastic or a water buoyant material in the form of a generally elongated-cylindrical tear-drop fuselage body 12. Body 12 starts with generally blunt front and tapers back to a generally symmetrical tear-drop rear end and is divided along a medial transverse plane to produce an upper lure body half 13 that is separable from lower body half 14. Body 12 may be provided with exterior features of the character described herein or may be provided with conventional exterior features such as shape, appearance, fins, tow means and fish hook means.

The interior of lure body 12 is hollowed out in the manner illustrated in FIG. 3 to provide a central internal apparatus housing cavity 15 with the center portion of cavity 15 having a generally cylindrical shape.

It will be understood from an examination of FIG. 3 that a part of each of these cavities is in the upper half of lure body 13 while the remaining half of each of these cavities is in the lower half of lure body 14, but this description is being written in terms of the shape of the entire cavity as a single entity even though it actually is subdivided by the splitting of said lure body 12 into upper and lower halves.

Housing cavity 15 is so designed or so positioned that one arc of its vertical circumference cuts through to an instrument adjustment surface opening 16 in at least one of the lure body halves. This surface opening to provide for manual adjustment of the rotatable thermostat element that is to be contained in cavity 15 can be positioned on either the upper surface or the lower surface, or similar openings could be provided on both the top and the bottom halves of the fish lure in order to make the thermostat guiding element accessible and adjustable from both sides of the lure.

Lure 11 is provided with a pair of lateral port openings 17-17 of generally circular shape cut from the exterior sides body 12 such that one of port openings 17 is positioned on the left side while the other port opening 17 is positioned on the right side with each of the said openings cutting through into housing cavity 15. Port openings 17-17 should be positioned near the mid-point of the length of the lure and should be so positioned that the axis thereof are substantially concentric with the center axis of cavity 15. In addition, port openings 17-17 should be of sufficient size to permit surrounding water to freely flow into and out of cavity 15.

The nose or forward end of lure 11 is provided with a concave dish shaped nose scoop 18 that is generally symmetrically centered on the longitudinal axis of revolution of the lure body. This disk shaped surface at the forward end of said lure is intended to aid in gathering samplings of surrounding water through which lure 11 may be moving so that such water samplings can be channeled through appropriate port openings and channeled through the temperature sensing mechanisms on the inside of lure body 12 but the actual design and appearance of said nose scoop 18 has been tailored to simulate the appearance of a face with a nose and eyes.

It will be probably desirable to provide guide pins and means of releasably attaching the upper and lower lure body halves 13 and 14 to each other by any appropriate attaching and securing means, but there should also be provided at least one assembly hole passageway 19 cut from a forward intermediate point in the upper surface of the lure body and extending perpendicular through both halves of said fish lure body to a similar intermediate point on the lower body half 14 with the passageway 19 being provided with a concave countersink opening 20 at at least one end of said assembly passageway. In addition, it will usually prove desirable to provide a duplicate concave countersink opening 20 at the opposite end of said passageway 19.

Since lure 11 is substantially symmetrical about the length of its axis of revolution, there will be some tendency for the lure to roll as it is pulled through the water. However, if the thermally responsive depth guidance system is to operate consistently, some means must be found of providing anti-roll horizontal stabilization to insure that the dorsal side of said lure remains upright at all times. At this point, however, it is relevant to point out that if the parts of said lure body structure 12 are fabricated from materials having differential buoyancy characteristics so that the ventral portions of said fish lure body 14 are provided with greater keel-effect weight than is present in the upper or dorsal half of fish lure body 13 that resulting shift of the center of gravity to a line below the longitudinal axis of lure body will help maintain said lure in upright position and will thereby improve the horizontal stability and anti-roll characteristics of said lure.

Along the horizontal medial surfaces 21 - 21 that divide lure upper body half 13 from lower body half 14 there is provided a plurality of buoyancy and specific gravity adjustment wells 22 - 22 recessed at spaced apart intervals into the fish lure body structure. A large buoyancy and specific gravity adjustment well 22 is provided in the center line near the posterior end of body 12. Air or space is captured in wells 22 - 22. When it is desirable to make the specific gravity weight of lure 11 heavier in order to fish at greater depths, this objective may be accomplished in part by inserting in wells 22 - 22 added ball-shaped weights 23 - 23, or if still greater weight is needed, then wells 22 - 22 can be loaded with metal or solid weights provided with an external shape like that of a capsule 24 - 24; such weights are illustrated in FIG. 4. If lure 11 is to be left in the water for some period of time with the wells empty, water can be prevented from collecting therein by filling the wells with a plastic water-tight capsule-shaped hollow plastic container 25 - 25 of the type illustrated in FIG. 5. Capsules 25 - 25 should be about the same size and shape as capsules employed in dispensing prescription medication. Capsules 25 - 25 will provide buoyancy if they are filled with air, or filled with a very light space occupying material such as styrofoam.

The heart of this invention turns upon the employment of a bi-metallic heat sensitive spiral-shaped thermostatic element 26 mounted vertically and longitudinally in cavity 15 in such a manner that samplings of the surrounding water can wet and actuate element 26 to produce rotary spiraling or unspiraling motion in coil 26 responsive to said samplings from the surrounding water — with the resultant thermally induced rotary motion being transmitted to an associated pair of lateral elevator fins 33 - 33 positioned on the left and right sides of the body so that the motion in the spiral element causes said pair of fins 33-33 to be driven up or down in such manner as to cause said lure 11 to climb or to dive in response to the sensed temperature in the surrounding water.

Element 26 is of such size and of such generally cylindrical dimensions as to fit conveniently into cavity 15 and in a mounting arrangement that will leave the center or internal end of element 26 positioned in line with the axis of lateral port openings 17-17. The device could be manufactured and used with a medium fixed setting of element 26. However, greater flexiblity and usefulness will be achieved if element 26 is mounted in a rotatably adjustable sub-housing structure that could be manually adjusted or pre-set to determine the thermal strata level at which said thermally reactive lure would level out, — such a thermostat sub-housing structure is shown in the form of a pair of semi-circular channel members 27-27 as illustrated in FIG. 3. Channel members 27-27 have the general appearance of a wheel when placed together to form a circle channel when they are mounted in housing cavity 15 such that only an outer arc portion of said manual adjustment device is visible through instrument adjustment surface opening 16 in the exterior surface of said fish lure body. Channel members 27-27 are fabricated with spaced-apart inward extending side rail flanges 28 - 28 located on each side thereof such that the space between said flanges 28-28 provides a semi-open housing for the thermostatic coil 26. Element 26 and channel members 27-27 are fabricated to match each other's proportions so that element 26 will fit snugly but securely into the housing structure formed by the interior cavity space within the channel members 27-27 while still having sufficient room for the element 26 to tighten or loosen its spiral coil structure in response to temperature changes. The outside surface area of members 27-27 are provided with textured calibration marks 29-29 which permits the channel members 27-27, when provided with such calibrations and mounted within the body of lure 11, to form a calibrated temperature selection adjustment knob which can be manually adjusted by manipulation of the arc portion of that is visible through surface opening 16.

The outside end of element 26 is bent outward at an approximately ninety degree angle to the surface of said thermostat spiral to form a lock flange 30 that inserts between the locks into position between the mating ends of channel members 27-27 so that the thermostat element 26 can be pre-set or programmed for a selected temperature setting when the pair of channel members are manually rotated within housing cavity 15. The structure and interrelationship between element 26 and members 27-27 is visually illustrated in the center of exploded FIG. 3.

The inner end of element 26 is bent inward at an approximate ninety degree angle to form a mounting flange 31 for an associated flat pivot plate 32 which will transmit rotary motion from element 26 to elevator fins 33-33. Pivot 32 is a generally rectangular flat plate fabricated from a heat conductive material and is mounted transversely through the center of element 26 and through the center of body 12 with the ends of the pivot plate extending outward through the port openings 17-17 on each side of the body. Each end of plate 32 is provided with a pair of spaced apart apertures intermediately positioned from the outer ends thereof and spaced a slight distance away from element 26 with the innermost perforations designated as rotation limiting apertures 34-34 while the outside apertures are designated as fin locking apertures 35-35.

It should be readily appreciated that fabrication of pivot plate 32 from metal or a similar efficient heat conductive material will assist in sampling the temperature of the surrounding water and transferring the results of this response to warm or cold water through pivot plate 32 to element 26 for conversion into rotary motion which is, in turn, fed back through pivot plate 32 to elevator fins 33-33 to cause said lure 11 to climb or dive in response to temperature changes. It will also be readily apparent in the light of the purposes described in this disclosure to employ a heat conductive welded joint or other heat conductive attaching and securing means to attach pivot plate 32 to mounting tab 31 on the center of element 26.

It should be noted at this point that the channel members 27-27 can be factory fabricated as a replaceable and interchangeable modular unit with a plurality of interchangeable units designed to cover different ranges of temperature. Since body 12 is divisable into separable upper and lower halves along the medial transverse plane, the lure can be readily opened to provide access to cavity 15 to facilitate replacement and substitution of said thermally responsive apparatus modules.

If fins 33-33 are fabricated from metal, they can be welded or directly and permanently attached to plate 32 and the heat conductive metal surfaces of such fins will increase the sensitivity and responsiveness of the thermal responsive apparatus. However, there may be instances where the employment of colored and/or special shaped plastic lateral fins 33-33 will outweigh the heat gathering advantages of using metal lateral fins. Therefore, the elevator fins 33-33 are fabricated in a form that can be releasably attached to each end of plate 32 so that interchangeable lateral fins can be substituted as required by the fisherman. These fins could be attached and removed in a variety of ways but in the exploded view in FIG. 3 a shaped friction lock recess 36 is used in each elevator fin adapted to be force fitted on each end of plate 32. In addition a friction locking shoulder projection 37 is provided on each lateral fin which is adapted to snap into fin locking aperture 35.

Figure 8:
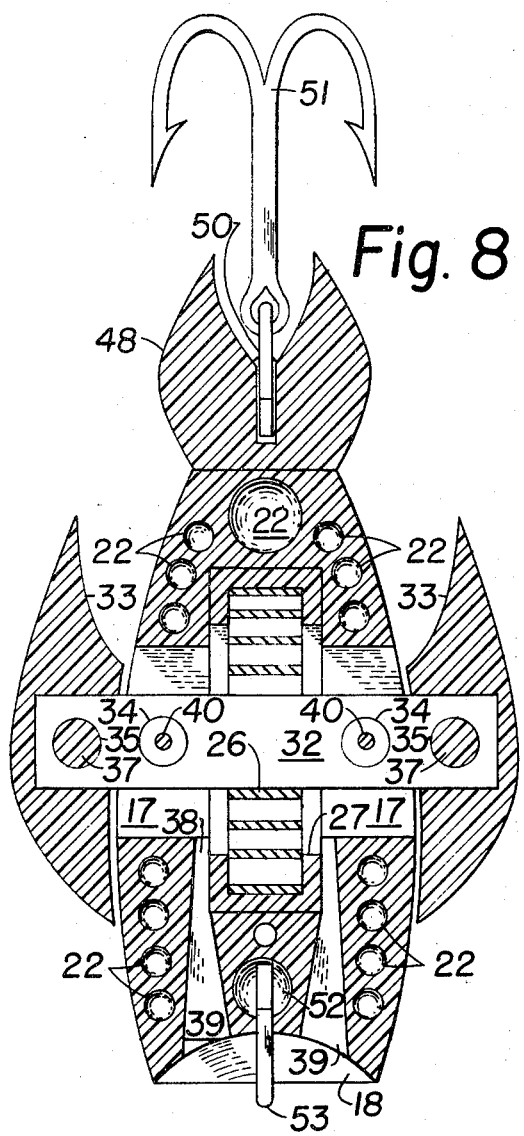
FIG. 8 is a top plan sectional view of the lure.
Figure 9:
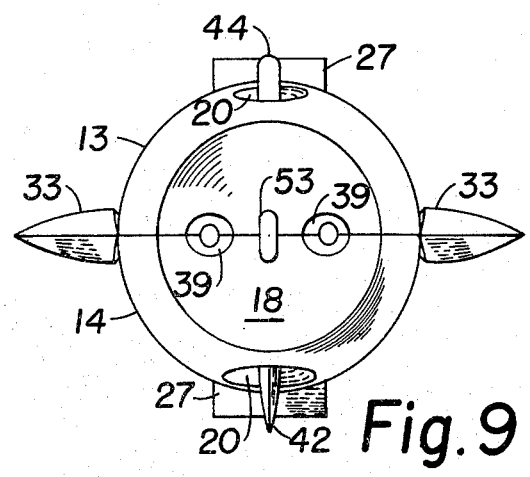
FIG. 9 is a front plan view of the lure.

As indicated above, the heat responsiveness of the lure and guidance apparatus in lure 11 is dependent upon bringing samplings of the surrounding water into wetting contact with element 26. Some temperature samplings will be picked up from the surrounding water and transmitted through pivot plate 32 and some samplings of the surrounding water will flow in and out through port openings 17-17 which will produce a measure of water contact with element 26. However, a more reliable means of securing and channeling continuous samplings of the surrounding water into direct wetting contact with said element 26 is provided by a pair of spaced apart water flow passageways 38-38 extending from spaced apart points in the forward nose portion of body 11 to points in cavity 15 on each side of element 26. The forward portions of passage ways 38-38 are reamed out for a slight distance to form funnel-shaped water induction ports 39-39 tapering into passageways 38-38. The flared front openings of ports 39-39 are laterally spaced apart from the center axis of the fish lure body at points inside the nose scoop 18 as shown in FIGS. 3, 8 and 9 so that the collective appearance of scoop 18, ports 39-39 and two hook means simulate the appearance of a round face with nose and eye features. As lure 11 is pulled through the water, water is trapped and pressure builds up within scoop 18 with a portion of the water being driven into ports 39-39 where it is compressed or accelerated by the diminishing size of passageways 38-38 until the water is spewed into cavity 15 such that new samplings of the surroundng water are continuously collected and driven into direct wetting contact with element 26. After the inflowing water has served its purpose it can flow out through openings 17-17.

Limited experience with testing a crude hand-made prototype of the bi-metallic spiral thermostat control mechanism revealed an unexpected instability problem. If lure 11 is drawn through a very warm water stratum the forward portions of elevator fins 33-33 will be rotated upward very sharply driving fish lure 11 into a very steep angle of climb. If the angle of climb becomes excessive or if the angle of climb exceeds ninety degress, the lure becomes unstable for a plurality of complicated reasons with the result that said climbing lure can stall and slip back in the water as element 26 and fins 33-33 reverse functions; or the lure can roll over on its back or go into a deep dive before thermal reaction can reverse the positioning of fins 33-33. A similar variety of instability can occur when lure 11 is put into an extremely steep dive. In this connection, it should be understood that when fins 33-33 are driven beyond a ninety degree angle of climb or dive or when the lure flips over in the water, that the thermally reactive behavior characteristics will be reversed such that lure 11 will dive when it is supposed to climb and will climb when the lure is supposed to dive.

This instability problem can also be complicated by an intermittent tendency for lure 11 to roll in the water when fins 33-33 move quickly or when the lure cannot respond rapidly enough to a sudden change in pitch of fins 33-33.

To remedy these instability symptoms, a pair of vertical restraint rods 40-40 is provided with each rod being vertically and centrally positioned in one of the openings 17-17 in body 12 in such position that the restraint rods 40 pass through the center of aperture 34 in plate 32. An examination of the positioning and relationship between rod 40 and restraint aperture 34 will indicate that at some maximum point of rotation that the circumference of aperture 34 will become impacted upon restraint rod 40 thereby limiting the maximum rate of climb or dive into which lure 11 can be placed. This restrictive feature substantially reduces the dangers of flop-over instability that would otherwise result from excessively steep rates of climb or dive.

The second source of instability came from an intermittent tendency of lure 11 to roll in the water and become unstable when some particle in the water struck only one of the lateral fins producing an unbalanced condition, or sudden changes in positioning of fins 33-33 also precipitated momentary roll instability. To remedy this aspect of the roll instability problem a weighted keel-like rudder fin 41-42 is provided and rotatably-adjustably mounted on the under side of body 12. When lure 11 is fairly large in size and has considerable buoyancy, conical rotary adjustment wedge 41 can be fabricated from metal material to serve as a ventral weighting means but it will probably be desirable in most instances to fabricate wedge 41 from a substantial plastic material of negligible weight. Attached to or fabricated as part of wedge 41, there is provided a ventral fin 42, which when rotated can serve as a rudder while the shape and ventral positioning of fin 42 restrains any tendency of lure 11 to roll in the water.

Figure 6:
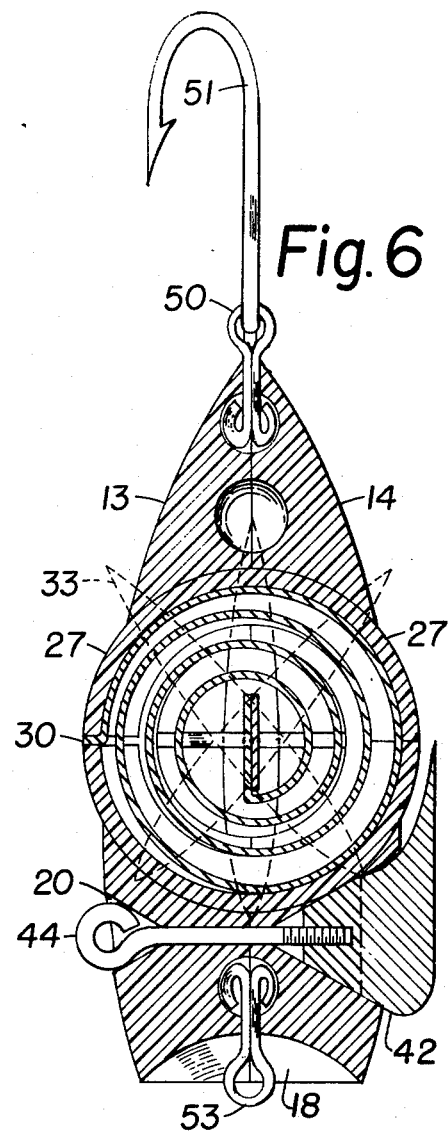
FIG. 6 is a side plan sectional view of the lure.
Figure 7:
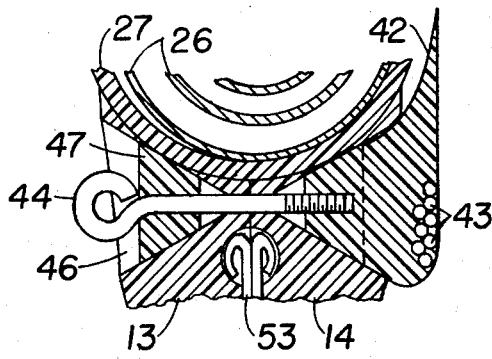
FIG. 7 is a plan sectional fragmentary side view of the front end of the fish lure showing an additional way of constructing a reversible front eyehook stabilization weight and lower directional fin assembly.

Satisfactory horizontal stabilization against roll instability can probably be achieved by fabricating fin 42 from a metal material where the buoyancy of body 12 is sufficient to carry the weight of a fin 42 fabricated from metal. However, in the case of small lures with only modest buoyancy characteristics, the mere size and shape of a light all plastic ventral fin 42 as illustrated in FIG. 6 may be sufficient to provide the amount of anti-roll stability required to maintain lure 11 upright in the water. In other instances, where some amount of weight must be provided at a ventral point remote from the central longitudinal axis of body 12 in order to secure the desired keel-rudder effect needed for horizontal stabilization, some measure of ventral keel weighting can be achieved by fabricating ventral fin 42 from a light plastic while achieving the necessary weighting effect by embedding small metal particles 43-43 into the lower most periphery of fin 42 as illustrated in FIG. 7.

A number of commercially available releasably-attachable securing means may be used to temporarily join together the top and bottom halves while still allowing the fisherman easy accessibility to the the interior of cavity 15 for replacement or substitution of parts.

An assembly bolt 44 is provided to secure fin 42 to the body. A plurality of interchangeable conical wedges 41 and associated ventral fins 42 could be provided to permit the substitution of fins of varying shapes and colors.

Conical wedge 41 is provided with a surface such that it may be rotated and then locked into place inside of counter-sink opening 20 when assembly bolt 44 is loosened and subsequently retightened thereby providing simple manually manipulatable means of rotary adjustment for associated ventral fin 42. This enables fin 42 to be employed as a rudder to cause lure 11 to swerve to either the left or the right. The mechanical nature of the rotary adjustment means will be readily apparent from examination of the relevant features of exploded FIG. 3 and the side plan view provided in FIG. 6.

Some of the foregoing parts of this disclosure have discussed ways of preventing reversal of the thermally induced behavior of the heat sensitive apparatus. However, in those rare cases where a fisherman encounters a thermal inversion in which a layer of cold water overlies a layer of warm water, it will be desirable for the fisherman to be able to deliberately reverse the thermal behavior characteristics of the apparatus. This can be accomplished in two ways. The combination heat sensing and thermally reactive apparatus module composed of apparatus housing 27-27, thermostat element 26, pivot plate 32 and elevator fins 33-33 can be picked up as a unit out of housing cavity 15 in the interior of the lure body, rotated to an upside-down position and re-inserted in such upsidedown position in cavity 15. This action will reverse the climb-dive characteristics of the lure in which it is installed.

The second way in which the fisherman may deliberately reverse the thermal reactive behavior characteristics of said fish lure 11 for use in a temperature inversion situation is for him to release thumb manipulatable bolt 44 so that both assembly bolt 44 and conical wedge 41 with attached and associated ventral fin 42 are removed from lure 11. Thereafter, wedge 41 is inserted into the upper counter-sink recess 46 and secured into place by said assembly bolt 44 inserted from the bottom of said lure 11 through the ventral opening of passageway 19. This reversal of positioning of a ventral fin 42 will reverse what constitutes the top and bottom of the lure, causing it to turn over in the water and a reversal of the climb-dive characteristics of the lure 11. In those cases where said dive-climb characteristics of the lure are to be reversed by re-positioning of ventral fin 42 it will be desirable to make the counter-sink openings 20-46 at each end of passageway 19 symmetrical with respect to each other as illustrated in FIG. 7. When the counter-sink openings 20-46 have both been made large enough to accommodate conical wedge 41, passageway 19 will be shortened to a length inadequate to properly support assembly bolt 44. To brace and support said assembly bolt 44 in holding together the two halves of the lure body 12 there is provided a conical spacer plug 47 that is to be inserted into the counter-sink opening 20 that will contain the eyehook end of bolt 44. The minor modifications of structure required for employment of this technique for reversing the climb-dive characteristics of lure 11 will be readily apparent from a careful examination of the fragmentary section view presented in FIG. 7.

Lure 11 is provided with a set of posterior tail fins 48 fabricated from a light plastic material in a conventional configuration and which may be permanently or separately attached to body 12. A plurality of variably shaped and colored substitute tail fins may be provided for attachment to the lure body.

At the rear end of body 12, there is provided an anchor locking recess 49 which extends into both the upper and lower body members 13 and 14. The posterior structure also includes a hook-eye anchor means 50 which locks or anchors into recess 49 at one end while at the other end provides a hinged or flexible hook attaching means for an upturned dual fishhook structure 51.

At the front end of body 12 a recess 52 is provided which receives a tow line locking means 53.

When lure 11 is employed for casting said lure will be intermittently alternated between environments of air and water with the result that air bubbles may become trapped in cavity 15 producing minor interference with water contact to element 26. In order to assist said air pockets or air bubbles to leak off rapidly while said fish lure is still immersed in water a pair of air vent notches 54-54 is positioned on the left and right sides of opening 16 starting from spaced-apart points in the upper apex of cavity 15 and extending upward along the left and right walls of opening 16 to merge into and terminate in calibration notches 55-55.

OPERATION

In normal operation, the depth selection and guidance means is first set to a specific temperature which will generally be below the surface temperature of the water unless there is a thermal inversion of the water or a top water action is preferred. To find the temperature of the water's surface the lure 11 may be temporarily immersed manually in the surface and then adjusted by rotating the channel members 27-27 such that the elevator fins 33-33 are parallel with the horizontal surfaces 21-21 and then reading the surface temperature on the marks 29 at the calibration notch 55. From this position the depth selection and guidance means is generally adjusted to a dive configuration with the specific temperature set at the optimum feeding temperature of the fish desired to be caught. Ater the line is attached, lure 11 may be used for casting or trolling. As the lure is pulled through the water, it will generally dive when it is set to a temperature colder than the surface of the water. As the lure approaches the set or desired temperature in the water, the angle of dive will become less and less steep until the set temperature of the lure is reached whereupon the elevator fins 33-33 will generally be in a position parallel to surfaces 21-21. If the water is calm and the thermal layers are generally parallel said lure will, under a steady pull, plane at that level. If the water is turbulent and the thermal distribution is more random, then the lure will continue to dive, ascend or even skew in seeking to maintain the preset temperature.

Since the elevator fins 33-33 are spring mounted, they will vibrate or fluctuate about the mean setting as the lure is pulled and jerked through the water, thus giving a more life-like action to the lure.

The lure will generally stay upright in the water, with the stability depending largely upon the location of the centers of gravity and buoyancy. If the lure is such that its specific gravity is equal to that of the water then it will stay at the level where it is when the horizontal movement is stopped. If the lure has a smaller specific gravity than the water it will rise toward the top with the ascending speed determined by its buoyancy. If the lure has a greater specific gravity than water the lure will begin to sink with the sinking speed determined by its lack of buoyancy.

If it is desired that a non-symmetrical or skewed action of the lure feign a hurt fish or bait, then the buoyancy can be imbalanced or the ventral fin or keel can be adjusted non-symmetrically.

Since the lure may be cast and reeled in, or be in and then out of the water continuously, there is the possibility of the control cavity capturing a bubble of air which may be undesirable, but the air escape vents will allow the bubble of air to be vented off.

For the most stable action of the fishing lure the line is tied or attached to the tow line attachment means 53. Such centerline attachment, with the line of the towing force passing approximately through the center of gravity and drag, is relatively stabilizing whereas the line attached elsewhere will cause limited instability. Thus by attaching the line to the eye of assembly bolt 44, the fishing lure can be made to shimmy or fluctuate sidewise as it is pulled through the water.

Although this specification has described only a single embodiment together with the addition of a number of optional features with certain applications thereof, it should be understood that structural or material rearrangements of adequate or equivalent parts, substitutions of equivalent functional elements and other modifications in structure can be made and other applications devised without departing from the spirit and scope thereof. The description and drawings herein should be regarded as only an illustration and as limited only as set forth in the following claims.

I claim:

1. An artificial fishing lure having temperature sensing and thermostatically controlled depth selection and guidance means adapted to cause said fish lure to seek and hold predetermined thermal stratum in a body of water where fish of a selected species may be expected to be found, said thermally responsive fishing lure comprising:
   A. a fish lure body fabricated from buoyant material and provided with
      1. conventional exterior features such as shape, appearance, fins, tow means, and fish hook means, and 2. a central internal apparatus housing cavity within said fish lure body, and with
   B. a bimetallic heat sensitive spiral shaped thermostatic element mounted in said central internal apparatus housing cavity within the fish lure body at a location where the thermostat element can be wetted by and thermally responsive to samplings from the surrounding water; with the thermally induced rotary motion being transmitted to
   C. an associated pair of left and right lateral elevator fins positioned on the left and right sides of said fish lure body so that temperature induced rotary motion in the spiral thermostat element will rotate said lateral fins up or down to cause said fish lure to climb or dive in response to sensed temperature in the surrounding water; and with
   D. interchangeable attachable-detachable fins to enable the fisherman to tailor the decorative ornamentation features of said fish lure to comply with his own preferences or the appearance that the fisherman thinks will be attractive to the fish he hopes to catch.

2. An artificial fishing lure having temperature sensing and thermostatically controlled depth selection and guidance means adapted to cause said fish lure to seek and hold a predetermined thermal stratum in a body of water where fish of a selected species may be expected to be found, said thermally responsive fishing lure comprising:
   A. a fish lure body fabricated from buoyant material and provided with
      1. conventional exterior features such as shape, appearance, fins, tow means, and fish hook means,
      2. said fish lure body being divisible into an upper body half and a separable lower body half,
      3. a central internal apparatus housing cavity within said fish lure body, and with
      4. left and right lateral port openings cut from the sides of the fish lure body into said central interior housing cavity with said lateral port openings being of sufficient size to permit surrounding water to freely flow into and out of said central interior housing cavity within the fish lure body;
   B. a bimetallic heat sensitive spiral shaped thermostatic element mounted vertically and longitudinally in said central internal apparatus housing cavity within the fish lure body in such manner that samplings of the surrounding water can wet and actuate said spiral shaped thermostatic element to produce thermally induced rotary motion in the thermostat coil that is transmitted to;
   C. an associated generally rectangular flat pivot plate mounted transversely through the left and right lateral port openings and through the said central internal apparatus housing cavity and connected to the center of said spiral shaped thermostatic control element so that temperature induced changes in the thermostatic element produces rotary motion in said pivot plate; which thermally induced rotary motion is transmitted by the pivot plate to;
   D. left and right elevator fins attached to either end of said pivot plate in such manner as to position said fins on each side of the fish lure body so that temperature induced expansion or contraction of the thermostatic control element delivers rotary motion through the pivot plate to said left and right elevator fins to drive said thermally responsive fish lure up or down in accordance with the temperature of the sampled water.

3. The thermally responsive fishing lure and apparatus described in claim 2 in which the body structure is fabricated from materials having differential buoyancy characteristics so that the ventral portions of said fish lure body are provided with greater keel-effect weight than is present in the upper parts of said fish lure body in order to improve the horizontal stability and anti-roll characteristics of said thermally responsive artificial fishing lure.

4. The thermally responsive fishing lure and apparatus described in claim 2 with said fish lure body structure being provided with a concave and generally dish shaped nose scoop structure at the forward end of said fish lure with said dish shaped nose scoop configuration of said nose scoop being structured and ornamented to simulate the appearance of a round face while the concave dish shaped structure assists in gathering water samples.

5. The thermally responsive fishing lure and apparatus described in claim 2 with interchangeable attachable-detachable fins to enable the fisherman to tailor the decorative ornamentation features of said fish lure to comply with his own preferences or the appearance that the fisherman thinks will be attractive to the fish he hopes to catch.

6. The thermally responsive fishing lure and apparatus described in claim 2 with the further provision of A. a pair of spaced apart water flow passageways extending from spaced apart points in the forward nose portion of the fish lure body to points in the central internal apparatus housing cavity on each side of the spiral thermostat element; and B. a pair of spaced apart funnel shaped water induction ports starting in forward nose portion of the fish lure body and merging into said water flow passageways such that as the fish lure is drawn through a body of water, that continuous samplings of the surrounding water are scooped up by said funnel-shaped water induction ports and channeled into the central apparatus housing cavity at points on each side of said thermostat element so that new samplings of the surrounding water are continuously fed into contact with the thermostat control element.

7. The thermally responsive fishing lure and apparatus described in claim 2 with further provision of A. a plurality of buoyancy and specific gravity adjustment wells recessed at spaced apart intervals into the fish lure body structure and accessible along the medial transverse splitting plane and surface of each half of said fish lure body; and B. a plurality of shaped insertable—removable weights of varying sizes that can be inserted into the specific gravity adjustment wells to make said fish lure sink more rapidly to greater depth when increased weight is needed.

8. The thermally responsive fishing lure and apparatus described in claim 2 with further provision of A. a plurality of buoyancy and specific gravity adjustment wells recessed at spaced apart intervals into the fish lure body structure and accessible along the medial transverse splitting plane and surface of each half of said fish lure body; and B. a plurality of watertight capsule shaped hollow plastic containers of such size as to be easily inserted into or removed from said specific gravity adjustment wells.

9. The thermally responsive fishing lure and apparatus described in claim 2 with further provision of a horizontal stabilizing weight to prevent said fish lure from rolling over as the lure travels in the water.

10. The thermally responsive fishing lure and apparatus described in claim 2 with further provision of a combination rotatable horizontal stabilizing weight and ventral rudder fin to enable said fish lure to skew left or right in the water without rolling over.

11. The thermally responsive fishing lure and apparatus described in claim 2 with the provision of restraint means to limit the angle of climb or the angle of dive and thereby minimize instability problems that can occur when the lure goes into an excessively steep climb or dive.

12. The thermally responsive fishing lure and apparatus described in claim 2 with weight repositioning means of reversing the dive-climb behavior of the thermally responsive fishing lure when the fisherman occasionally tries to fish in a body of water in which a thermal inversion has occured.

13. An artificial fishing lure having temperature sensing and thermostatically controlled depth selection and guidance means adapted to cause said fish lure to seek and hold a predetermined thermal stratum in a body of water where fish of a selected species may be expected to be found, said thermally responsive fishing lure comprising:

A. a generally elongated-cylindrical tear drop fuselage body
 1. fabricated from a water-buoyant material,
 2. being divided into generally symmetrical halves along a medial transverse plane producing an upper body half that is separable from the lower body half,
 3. a central internal apparatus housing cavity,
  a. having a cylindrical shape,
  b. positioned perpendicular to the medial transverse plane of the lure body,
  c. the center axis of said cylindrical-shaped apparatus housing cavity being in the medial transverse plane and perpendicular to the axis of revolution of the lure body,
  d. said central internal apparatus housing cavity cutting through to a surface opening in at least one of the body halves of said fish lure,
 4. a pair of lateral port openings cut from the exterior sides of the fish lure body into the central internal housing cavity
  a. positioned near the midpoint of the length of said fish lure, and
  b. that is positioned such that the axis of said lateral port openings are substantially concentric with the center axis of said central internal apparatus housing cavity,
 5. a concave dish-shaped nose scoop symmetrically centered on the longitudinal axis of revolution at the forward end of said fish lure fuselage body,
 6. at least one assembly hole passageway
  a. cut from a forward intermediate point in the upper surface of the fish lure body,
  b. extending perpendicular through both halves of said fish lure body to a similar intermediate point on the lower body half, and
  c. provided with convex counter-sink openings at each end of said assembly passageway;

B. a pair of semicircular channel members having
 1. spaced apart inward extending side rail flanges such that the interior of the mated semicircular channel members provide a semi-open housing for a thermostatic coil, while
 2. textured calibration marks on the outside surface of the wheel-shaped semi-circular channel members form a temperature selection adjustment knob, with
 3. said semicircular channel member thermostat housing structure being proportioned to snugly fit into and being rotatably mounted in a vertical position within the central internal apparatus housing cavity of the fish lure body structure with at least one arc portion of said outside surface extending through the previously provided opening in one of the body surfaces in order to permit convenient manual access to and adjustment of the knob-like channel-shaped housing for the thermostat apparatus;

C. a bimetallic heat sensitive thermostatic spiral element of such size and such generally cylindrical dimensions as to fit securely but loosely within the cavity formed by the spaced apart side rail flanges on the interior surface of the hollow wheel-like pair of semi-circular channel members
 1. with the outer end of said thermostat element bent outward at an approximately ninety degree angle to the surface of said thermostat spiral to form a flange that inserts between and locks into position between the mating ends of the semi-circular channel members so that said thermostat element is adjusted when said wheel-shaped and knob-like pair of semi-circular channel members are manually rotated within its central housing cavity in the fish lure body, while
   2. the inner end of the spiral shaped thermostat element is bent inward at an approximate 90° angle to form a mounting flange for a pivot plate;
D. a generally rectangular flat pivot plate fabricated from heat conductive material with
   1. the midpoint of said flat pivot plate being heat conductively attached to the mounting flange on the inner end of the spiral thermostat element, such that
   2. said pivot plate is mounted transversely through the center of the thermostat element and through the center of the fish lure body with the ends of said transversely positioned pivot plate extending outward through the lateral port openings on each side of the fish lure body, and
   3. each end of said flat pivot plate being provided with a pair of spaced apart apertures intermediately positioned from the outer ends of said pivot plate and spaced a slight distance away from the spiral-shaped thermostat element, with the innermost pair of perforations being designated as rotation limiting apertures and the outside apertures at each end of the pivot plate being designated as fin locking apertures;
E. a pair of vertical restraint rods, each restraint rod being mounted vertically and centrally in one of the left and right lateral port openings in the fish lure body such that the left restraint rod passed through the center of the left rotation restraint aperture in the pivot plate and the right restraint rod passes through the right restraint aperture in said pivot plate;
F. left and right lateral elevator fins rigidly attached to either end of said flat pivot plate;
G. a set of lateral posterior tail fins securely attached to the rear end of the fuselage body structure of said fish lure;
H. a ventral fin that is rotatably attached to the forward underside of the lower half body portion of said fish lure;
I. a tow line attachment means mounted at an appropriate position in the forward portion of the fish lure body;
J. fish hook means flexibly connected to the rear end of said fish lure body; and
K. means for releasably attaching and securing the upper and lower halves of said fish lure body together including some form of bolt securing means extending through the vertical assembly passageway provided in the forward portion of said fish lure body structure.

14. The thermally responsive fishing lure and apparatus described in claim 13 in which the body structure is fabricated from materials having differential buoyancy characteristics so that the ventral portions of said fish lure body are provided with greater keel-effect weight than is present in the upper parts of said fish lure body in order to improve the horizontal stability and anti-roll characteristics of said thermally responsive artificial fishing lure.

15. The thermally responsive fishing lure and apparatus described in claim 13 with the further provision of A. a pair of spaced apart water flow passageways extending from spaced apart points in the forward nose portion of the fish lure body to points in the central internal apparatus housing cavity on each side of the spiral thermostat element; and
B. a pair of spaced apart funnel shaped water induction ports starting in forward nose portion of the fish lure body and merging into said water flow passageways such that as the fish lure is drawn through a body of water, that continuous samplings of the surrounding water are scooped up by said funnel—shaped water induction ports and channeled into the central apparatus housing cavity at points on each side of said thermostat element so that new samplings of the surrounding water are continuously fed into contact with the thermostat control element.

16. The thermally responsive fishing lure and apparatus described in claim 13 with further provision of
A. a plurality of buoyancy and specific gravity adjustment wells recessed at spaced apart intervals into the fish lure body structure and accessible along the medial transverse splitting plane and surface of each half of said fish lure body; and
B. a plurality of shaped weights of varying sizes that can be inserted into the specific gravity adjustment wells to make the fish lure heavier in fishing at greater depths.

17. The thermally responsive fishing lure and apparatus described in claim 13 with further provision of
A. a plurality of buoyancy and specific gravity adjustment wells recessed at spaced apart intervals into the fish lure body structure and accessible along the medial transverse splitting plane and surface of each half of said fish lure body; and
B. a plurality of watertight capsule shaped hollow plastic containers of such size as to be easily inserted into or removed from said specific gravity adjustment wells.

18. The thermally responsive fishing lure and apparatus described in claim 13 adapted to receive and use a replaceable and interchangeable insertable-removable thermally responsive module designed to perform over a selected temperature range with said thermally responsive module including
A. a pair of mated semi-circular channel members adapted to insertably-removably fit into the central apparatus housing cavity in said artificial fish lure body and to provide a rotatably adjustable housing for the apparatus enumerated in this claim;
B. a bi-mettalic heat sensitive thermostatic element mounted inside said pair of semi-circular channel member housing structures; and
C. an attached pivot plate transversely mounted through the center of said thermostatic element and adapted to have lateral elevator fins attached to each end of said transverse pivot plate;
with said sub-assembly being manufactured as a replaceable-interchangeable package unit for use in said thermally responsive fishing lure.

19. The thermally responsive fishing lure and apparatus described in claim 13 in which there is provided a pair of spaced apart air vent notches extending from the upper apex of the central apparatus housing cavity in said fish lure body structure through to the dorsal surface of said fish lure to provide a means for air bubbles trapped in the apparatus housing cavity to escape from said cavity.

20. The thermally responsive fishing lure and apparatus described in claim 13 with further provision of a combination rotatable horizontal stabilizing weight and ventral rudder fin to enable said fish lure to skew left or right in the water without rolling over.

21. The thermally responsive fishing lure and apparatus described in claim 13 with interchangeable attachable-detachable fins to enable the fisherman to tailor the decorative ornamentation features of said fish lure to comply with his own preferences or the appearance that the fisherman thinks will be attractive to the fish that he hopes to catch.

* * * * *